United States Patent
Chopin

(10) Patent No.: US 11,787,977 B2
(45) Date of Patent: Oct. 17, 2023

(54) REINFORCEMENT MEMBER COMPRISING A STRUCTURAL ADHESIVE ON A POLYESTER CARRIER

(71) Applicant: Zephyros, Inc., Romeo, MI (US)

(72) Inventor: Eric Chopin, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 17/477,247

(22) Filed: Sep. 16, 2021

(65) Prior Publication Data

US 2022/0041896 A1 Feb. 10, 2022

Related U.S. Application Data

(63) Continuation of application No. 15/560,918, filed as application No. PCT/EP2016/056591 on Mar. 24, 2016, now Pat. No. 11,124,678.

(30) Foreign Application Priority Data

Mar. 25, 2015 (EP) ..................................... 15160884
May 27, 2015 (EP) ..................................... 15169445

(51) Int. Cl.
| | |
|---|---|
| C09J 5/08 | (2006.01) |
| C09J 7/25 | (2018.01) |
| C08J 5/04 | (2006.01) |
| C08K 7/14 | (2006.01) |
| C08K 7/02 | (2006.01) |

(52) U.S. Cl.
CPC ................ C09J 7/255 (2018.01); C08J 5/04 (2013.01); C08J 5/043 (2013.01); C08K 7/14 (2013.01); C08J 2367/02 (2013.01); C08K 7/02 (2013.01); C09J 5/08 (2013.01); C09J 2301/41 (2020.08); C09J 2463/00 (2013.01); C09J 2467/006 (2013.01); Y10T 428/249984 (2015.04); Y10T 428/249987 (2015.04)

(58) Field of Classification Search
None
See application file for complete search history.

(56) References Cited

U.S. PATENT DOCUMENTS

| | | | |
|---|---|---|---|
| 4,755,251 A | 7/1988 | Cline | |
| 4,990,549 A | 2/1991 | Delvin | |
| 5,231,147 A | 7/1993 | Hartman | |
| 6,341,467 B1 | 1/2002 | Wycech | |
| 8,546,469 B2 | 10/2013 | Lee | |
| 11,124,678 B2* | 9/2021 | Chopin | .................... C08K 7/14 |
| 2004/0256888 A1* | 12/2004 | Le Gall | ................ B62D 29/002 |
| | | | 296/187.02 |
| 2009/0246506 A1* | 10/2009 | Zaluzec | .................. B05D 3/144 |
| | | | 427/535 |
| 2010/0009158 A1 | 1/2010 | Imaizumi | |
| 2011/0144239 A1 | 6/2011 | Lee et al. | |
| 2011/0206890 A1 | 8/2011 | Belpaire | |
| 2017/0246766 A1 | 8/2017 | Dehondt | |

FOREIGN PATENT DOCUMENTS

| | | | | |
|---|---|---|---|---|
| CN | 102093677 A | 6/2011 | | |
| CN | 101454132 A | 2/2012 | | |
| EP | 1854704 A1 | 11/2007 | | |
| EP | 2019027 A1 * | 1/2009 | ........... | B62D 29/002 |
| EP | 2019027 A1 | 1/2009 | | |
| JP | 2015007212 A | 1/2015 | | |
| WO | 2015/011686 A1 | 1/2015 | | |
| WO | WO-2015011687 A1 * | 1/2015 | .............. | C08J 5/128 |

OTHER PUBLICATIONS

Finter, J et al., Reinforcement Element for Reinforcing Cavities in Structural Parts, Jan. 28, 2009, machine translation of EP2019027 (Year: 2009).*
PCT International Search Report & Written Opinion dated Jun. 1, 2016; Application No. PCT/EP2016/056591.
Lanxess Deutchland GmbH: "Performance Energized by EF, XF and High-Modulus Product Lines: Easy-Flow and High Strength", dated Oct. 1, 2014, https://techcenter.lanxess.com/scp/emea/en/home/index.jsp.

* cited by examiner

Primary Examiner — Anish P Desai
(74) Attorney, Agent, or Firm — The Dobrusin Law Firm, P.C.; Daniela M. Thompson-Walters

(57) ABSTRACT

The invention relates to a reinforcement member comprising a heatcurable structural adhesive on a carrier member, wherein the carrier member comprises a fiber-reinforced polyester material. The invention further relates to a method to produce such a reinforcement member and its use.

20 Claims, No Drawings

REINFORCEMENT MEMBER COMPRISING A STRUCTURAL ADHESIVE ON A POLYESTER CARRIER

FIELD OF THE INVENTION

The invention relates to a reinforcement member comprising a heatcurable structural adhesive on a carrier member, wherein the carrier member comprises a fiber-reinforced polyester material. The invention further relates to a method for producing such a reinforcement member and its use.

BACKGROUND ART

Structural adhesives are extensively used for bonding components in the automotive industries, aircraft industries, and other industries.

Structural adhesives are often provided on carrier members as outer layers or coatings. The carrier members are typically prepared as intermediates and subsequently provided with a layer of a heatcurable structural adhesive or an overcoat thereof thereby providing reinforcement members. The carrier members are preferably made from thermoplastic materials, especially due to their lower weight compared to metals and alloys. Depending upon the structure of the carrier member and of the overall structure of the resultant reinforcement member, it is often desirable to prepare the carrier members by processing of thermoplastic materials, e.g. compression molding, extrusion molding, injection molding, thermoforming and the like, and then to apply the heatcurable structural adhesives to the surface or a portion of the surface of the frozen carrier members.

In conventional reinforcement members, carrier members are typically made from thermoplastic polyamides. However, one of the drawbacks of these carrier members is their E-modulus that varies with atmospheric variation, particularly relative humidity. According to the suppliers of the polyamides, E-moduli measured under standard conditions are satisfactory, e.g. in the range of about 9 GPa. In practice it has been revealed, however, that significantly lower E-moduli, e.g. in the range of only about 6 GPa, should be used in computer aided engineering (CAE) simulations which are often used for designing reinforcement members. It appears that polyamides are hygroscopic and sensitive to moisture. The level of water absorption depends of the polyamide type, the polyamide content, and the environmental conditions (temperature and relative humidity). While moisture uptake of polyamides is principally a reversible phenomenon, drying starts at temperatures above the glass transition temperature (~65° C.). In consequence of moisture absorption, the mechanical properties of polyamide carriers vary with varying ambient conditions, especially humidity. This is particularly disadvantageous, as modern automotive and aircraft industries operate globally with construction facilities in many countries having different climates.

EP 1 854 704 discloses joints that are formed for articles of manufacture such as transportation vehicles (e.g., automotive vehicles). The joints typically include a connector that is adhered to a first member and a second member with a structural adhesive, which is a structural adhesive foam.

LANXESS high-modulus thermoplastics, LXS-HPM-064EN, Edition 2014-10 relates to Durethan® and Pocan® EF and XF product lines, which are polyamide 6 and 66 grades, and polybutylene terephthalates (PBT).

WO 2015/011686 relates to flexible films of thermosetting adhesive materials which are non-tacky to the touch, are storage stable at room temperature, and can be cured at elevated temperature with a short cure time, and can be cured to produce a tough flexible adhesive layer including bonding to oily surfaces. The materials are particularly useful in bonding together dissimilar substrates. By curing upon heat activation, the cured adhesive films can be used for bonding of metals to fiber reinforced resins such as glass, carbon or aramid fiber reinforced epoxy or polyester based resins.

There is a demand for reinforcement members that overcome the drawbacks of the prior art.

It is an object of the invention to provide reinforcement members that have advantages over the prior art. The reinforcement members should have excellent mechanical properties that remain essentially constant under varying climatic conditions so that the reinforcement members are useful e.g. in automotive and aircraft industries all over the world. Further, they should have a low weight, should be available at low costs and should be easy to manufacture.

This object has been achieved by the subject-matter of the patent claims.

SUMMARY OF THE INVENTION

In a first aspect, the invention relates to a reinforcement member comprising a heatcurable structural adhesive on a carrier member, wherein the carrier member comprises a fiber-reinforced polyester material. The reinforcement member includes a carrier member and a heatcurable structural adhesive placed over the carrier member. Typically, the heatcurable structural adhesive is in intimate contact with the carrier member.

The heatcurable structural adhesive of the reinforcement member is an activatable material that is configured e.g. to provide reinforcement upon application of heat by adhering to the interior walls of a hollow structure in which the reinforcement member has been placed. Besides reinforcement, the reinforcement member may alternatively or additionally serve other purposes. In general, the reinforcement member is useful for reducing noise, vibration and/or harshness (NVH). Preferably, the heatcurable structural adhesive is configured to also expand upon application of heat.

The carrier member according to the invention comprises a fiber reinforced polyester material. Typically, the carrier member can be molded after being heated, especially by compression molding, extrusion molding, injection molding, or thermoforming techniques enabling complex three-dimensional structures at low weight.

It has been surprisingly found that compared to other materials which are conventionally used for preparing extrusion moldable or injection moldable carrier members, especially polyamides, the fiber-reinforced polyester material according to the invention has substantial advantages, especially when the three-dimensional structure of the carrier member is complex. The fiber-reinforced polyester material provides an optimized compromise of various properties, especially stiffness (e.g. in terms of E-modulus), weight (density), temperature resistance, and costs.

Further, it has been surprisingly found that the carrier member based on fiber-reinforced polyester material is less moisture sensitive so that its E-modulus does not need to be reduced for CAE simulations. Accordingly, the reinforcement members according to the invention can be used worldwide under various climatic conditions and simulations can be based on constant parameters such as E-moduli, temperature resistance (heat deflection temperature).

Furthermore, it has been surprisingly found that especially at comparatively complex three-dimensional structures, reinforcement members based on fiber-reinforced polyester carrier members are substantially smaller and hence lighter than those based on polyamide carrier members providing similar reinforcement performance, at least at low humidity.

DETAILED DESCRIPTION OF THE INVENTION

Unless expressly stated otherwise, all percentages are by weight (wt.-%). Expressions like "comprising", "containing", and "including" are to be interpreted in an open meaning, i.e. not excluding the presence of additional features which are not mentioned in connection with said expressions. In preferred embodiments, however, these expressions may independently of one another be replaced by the expression "consisting of", which is to be interpreted in a closed meaning, i.e. excluding the presence of additional features not mentioned in connection with said expression.

For the purpose of specification, "heatcurable structural adhesive" refers to the still heatcurable material, i.e. to the structural adhesive prior to heating to or above the cure temperature (that induces curing, crosslinking, hardening), whereas "structural adhesive material" refers to the structural adhesive after curing, crosslinking, and hardening, respectively. Prior to heatcuring, the heatcurable structural adhesive is preferably dry to the touch at ambient temperature and can be processed at intermediate temperatures by techniques such as melt coating, extrusion or injection molding without significant cross-linking of the polymer system occurring.

The reinforcement member according to the invention may be applied to various articles of manufacture. After heatcuring, the structural adhesive material may bond a first surface of one, two or more components (e.g., members) to a second surface of one, two or more components. Such bonding can provide structural integrity and/or adhesion to components of articles and may also provide sealing, damping, reinforcement or the like to the component of the articles. Examples of such articles of manufacture include but are not limited to household or industrial appliances, furniture, storage containers, buildings, structures, or the like. In preferred embodiments, the reinforcement member is applied to components of an automotive vehicle such as body or frame members (e.g., a vehicle frame rail). The heatcurable structural adhesive on the carrier member can be applied to one or more surfaces of one of the components or articles in a pre-activated state in which it adheres to the surface whilst remaining heatcurable thus it will adhere to the surface on application as a melt without curing. The heatcurable structural adhesive may subsequently be activated to cure or harden, and optionally expand and/or foam. Upon application, the heatcurable structural adhesive typically wets the surfaces that it contacts to adhere to those surfaces.

Preferably, the connection between the carrier member and the heatcurable structural adhesive is an adhesive bond, a form- and/or a force-fit (e.g. dog-tail joint). In a preferred embodiment, the connection is seamless.

The dimensions of the reinforcement member are not particularly limited and depend on the intended use of the reinforcement member, e.g. the size and volume of the cavity where it is to be placed at. Typical dimensions are within the range of from a few centimeters, e.g. about 1 mm or about 10 mm, to several centimeters, e.g. about 300 mm or about 500 mm, or even several meters.

Preferably, the reinforcement member has a 3D-shape, i.e. the reinforcement member has cross-section that does not comprise a constant thickness over its entire extension. In preferred embodiments, at least a part of cross section of the reinforcement member is C-, E-, T-, U-, V-, I-, O-, and/or W-shaped. Additionally or alternatively, the reinforcement member can have a hollow structure, wherein, according to a preferred embodiment, the carrier member and the heatcurable structural adhesive form one ring. The cross section of the reinforcement member can vary with its length. The cross section and/or the heatcurable structural adhesive can vary with the length of the reinforcement member. A structure with a closed cross section can be made from two structures with an open cross section. For example, an O-shape can be made by linking two U-shapes to one another. Furthermore, the structures to be linked can be made by the same or by different techniques. For example, a molded structure can be linked to an extruded structure.

The heatcurable structural adhesive may be applied to one or more outer surfaces of the carrier member. Preferably, the heatcurable structural adhesive covers at least a portion of the outer surface of the carrier member. In preferred embodiments, the heatcurable structural adhesive covers at least about 5%, or at least about 10%, or at least about 30%, or at least about 50%, or at least about 70%, or at least about 90%, of the outer surface of the carrier member or about its total outer surface (100%).

The relative weight ratio of the total weight of the carrier member to the total weight of the heatcurable structural adhesive is not particularly limited. In preferred embodiments, the total weight of the carrier member is greater than the total weight of the heatcurable structural adhesive, or the total weight of the carrier member is about the same as the total weight of the heatcurable structural adhesive, or the total weight of the heatcurable structural adhesive is greater than the total weight of the carrier member.

The carrier member provides a support for the heatcurable structural adhesive. While main purposes of the heatcurable structural adhesive are to provide adhesion as well as reinforcement to the overall final structure, a main purpose of the carrier is to provide reinforcement.

The size of the carrier member is not particularly limited.

Preferably, the carrier member has a 3D-shape, i.e. the carrier member has cross-section that does not comprise a constant thickness over its entire extension. In preferred embodiments, at least a part of cross section of the carrier member is C-, E-, T-, U-, V-, I-, O-, and/or W-shaped.

Preferably, the material of the carrier member, especially the fiber reinforced polyester material, has an E-modulus (tensile modulus, preferably determined according to ISO 527-1, 2 at 1 mm·min$^{-1}$) of at least about 10 GPa, or at least about 11 GPa, or at least about 12 GPa, more preferably at least about 13 GPa, or at least about 14 GPa, still more preferably at least about 15 GPa, or at least about 16 GPa, and even more preferably at least about 17 GPa, or at least about 18 GPa, or at least about 19 GPa, or at least about 20 GPa, or at least about 21 GPa. Preferably, the E-modulus is not moisture sensitive, i.e. at different relative humidity (r.h.) of the ambient air, e.g. at 50% r.h. and at 70% r.h., the E-modulus of the carrier member preferably does not vary relatively by more than about 5%, more preferably by not more than about 2%.

Preferably, the material of the carrier member, especially the fiber reinforced polyester material, has a flexural modulus (preferably determined according to ISO 178-A at 2 mm·min$^{-1}$) of at least about 10 GPa, or at least about 11 GPa, or at least about 12 GPa, more preferably at least about 13 GPa, or at least about 14 GPa, still more preferably at least about 15 GPa, or at least about 16 GPa, and even more preferably at least about 17 GPa, or at least about 17.5 GPa.

Preferably, the material of the carrier member, especially the fiber reinforced polyester material, has a density (preferably determined according to ISO 1183) within the range of about 1770±350 kg m$^{-3}$, more preferably about 1770±300 kg m$^{-3}$, still more preferably about 1770±250 kg m$^{-3}$, yet more preferably about 1770±200 kg m$^{-3}$, even more preferably about 1770±150 kg m$^{-3}$, most preferably about 1770±50 kg m$^3$, and in particular about 1770±25 kg m$^3$.

Preferably, the material of the carrier member, especially the fiber reinforced polyester material, has a temperature of deflection (heat deflection temperature) under a load of 1.80 MPa (preferably determined according to ISO 75-1,-2) of at least about 170° C., or at least about 175° C., or at least about 180° C., more preferably at least about 185° C., or at least about 190° C., still more preferably at least about 195° C., or at least about 200° C., and even more preferably at least about 205° C., or at least about 210° C.

Preferably, the material of the carrier member, especially the fiber reinforced polyester material, has a temperature of deflection (heat deflection temperature) under a load of 0.45 MPa (preferably determined according to ISO 75-1,-2) of at least about 190° C., or at least about 195° C., or at least about 200° C., more preferably at least about 205° C., or at least about 210° C., still more preferably at least about 215° C., or at least about 220° C., and even more preferably at least about 225° C., or at least about 230° C.

Preferably, the ratio of E-modulus/density of the material of the carrier member, especially the fiber reinforced polyester material, is within the range of about 10.5±3.5 MPa m$^3$ kg$^{-1}$, more preferably about 10.5±3.0 MPa m$^3$ kg$^{-1}$, still more preferably about 10.5±2.5 MPa m$^3$ kg$^{-1}$, yet more preferably about 10.5±2.0 MPa m$^3$ kg$^{-1}$, even more preferably about 10.5±1.5 MPa m$^3$ kg$^{-1}$, most preferably about 10.5±1.0 MPa m$^3$ kg$^{-1}$, and in particular about 10.5±0.5 MPa m$^3$ kg$^{-1}$.

Preferably, the material of the carrier member, especially the fiber reinforced polyester material, has an injection molding-melt temperature (preferably determined according to ISO 294) within the range of about 280±30° C., more preferably about 280±20° C., and most preferably about 280±10° C. Preferably, the material of the carrier member, especially the fiber reinforced polyester material, has a injection molding-mold temperature (preferably determined according to ISO 294) within the range of about 90±15° C., more preferably about 90±10° C., and most preferably about 90±5° C.

Preferably, the material of the carrier member, especially the fiber reinforced polyester material, has a melting temperature (preferably determined according to ISO 11357-1, 3 at 10° C.·mm$^{-1}$) within the range of about 205 to 280° C., more preferably about 215 to 270° C., and most preferably about 225 to 260° C.

The carrier member comprises, preferably essentially consist of a fiber-reinforced polyester material.

Preferably, at least about 90 wt.-%, more preferably at least about 95 wt.-% and most preferably at least about 99 wt.-% of the carrier member is composed of the fiber-reinforced polyester material, relative to the total weight of the carrier member.

Preferably, the fiber-reinforced polyester material comprises fibers, one or more polyesters and optionally one or more additives that are conventionally used in polymer compositions such as fillers, dyes, plasticizers, stabilizers, antioxidants, and the like.

Preferably, the sum of the total weight of the fibers and the total weight of the one or more polyesters amounts to at least about 80 wt.-%, more preferably at least about 85 wt.-%, still more preferably at least about 90 wt.-%, and most preferably at least about 95 wt.-% of the total weight of the carrier member.

The carrier member comprises a fiber-reinforced material, i.e. a material in which fibers are dispersed in such a way that they provide reinforcement.

The fibers of the fiber-reinforced polyester material are not particularly limited. The fibers may be natural or synthetic or mixtures thereof. Typically, the fibers are elongated fibers, e.g. substantially uniaxed particles.

Natural fibers include but are not limited to fibers derived from plants (e.g., fibers based on cellulose, such as cotton, linen, jute, flax, ramie, sisal, hemp and wood) and fibers derived from minerals (e.g. asbestos).

Synthetic fibers include but are not limited to glass fibers, carbon fibers and aramid fibers. Preferably, the fiber-reinforced polyester material comprises glass fibers or carbon fibers. In a preferred embodiment, the carbon fibers are continuous filament carbon fibers that are obtainable e.g. by pyrolyzing, or decomposing by heating, carbon-containing fibers such as rayon, polyacrylonitrile and petroleum pitch. Glass fibers are particularly preferred.

The fibers may be associated into bundles with a polymeric binder, e.g. a polyamide terpolymer binder.

The fibers preferably have an average length in the range of several μm, e.g. about 20±10 μm, or about 40±20 μm, or about 60±30 μm, or about 80±40 μm, or about 100±50 μm, or about 150±75 μm, or about 200±100 μm, or about 500±250 μm.

Preferably, the content of the fibers, preferably glass fibers or carbon fibers, is within the range of from about 15 wt.-% to about 70 wt.-%, relative to the total weight of the fiber-reinforced polyester material.

In a preferred embodiment, the content of the fibers, preferably glass fibers or carbon fibers, is within the range of about 45±25 wt.-%, more preferably about 45±20 wt.-%, still more preferably about 45±15 wt.-%, even more preferably about 45±10 wt.-%, and most preferably about 45±5 wt.-%, relative to the total weight of the fiber-reinforced polyester material. In another preferred embodiment, the content of the fibers, preferably glass fibers or carbon fibers, is within the range of about 55±25 wt.-%, more preferably about 55±20 wt.-%, still more preferably about 55±15 wt.-%, even more preferably about 55±10 wt.-%, and most preferably about 55±5 wt.-%, relative to the total weight of the fiber-reinforced polyester material. In still another preferred embodiment, the content of the fibers, preferably glass fibers or carbon fibers, is within the range of about 65±25 wt.-%, more preferably about 65±20 wt.-%, still more preferably about 65±15 wt.-%, even more preferably about 65±10 wt.-%, and most preferably about 65±5 wt.-%, relative to the total weight of the fiber-reinforced polyester material.

The carrier member comprises a polyester material. The polyester material may comprise one or more different polyesters. When the polyester material comprises different polyesters, they may differ in their chemical composition and/or in their average molecular weight.

Independently of one another, the one or more polyesters may be linear or branched, aromatic or aliphatic, homopolymers or copolymers (e.g. bipolymers or terpolymers), derived from dicarboxylic acids and diols and/or from hydroxycarboxylic acids.

The average molecular weight of the one or more polyesters in the polyester material is not particularly limited. The weight average molecular weight is preferably within the range of from about 10,000 to about 250,000 g/mol, more preferably about 25,000 g/mol to about 100,000 g/mol. The dispersity $M_w/M_n$ is preferably within the range of from about 1.2 to about 4, more preferably about 1.8 to about 2.8.

Preferably, the polyester material comprises an aromatic polyester that is preferably derived from one or more aromatic dicarboxylic acids and/or one or more aliphatic diols. Said aromatic polyester may be derived from several different monomers.

The one or more aromatic dicarboxylic acids are preferably selected from the group consisting of phthalic acid, isophtalic acid, terephthalic acid, and mixtures thereof. Terephthalic acid is particularly preferred. The one or more aliphatic diols are preferably selected from ethylene glycol, propylene glycol, butylene glycol, pentylene glycol, hexylene glycol, and the mixtures thereof.

Preferably, the polyester material comprises an aromatic polyester comprising, preferably essentially consisting of repetition units of general formula (I)

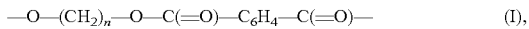

$$—O—(CH_2)_n—O—C(=O)—C_6H_4—C(=O)— \qquad (I),$$

wherein n is 2, 3, 4, 5 or 6, preferably 2 or 4.

Preferred representatives are polyethylene terephthalate (PET), modified PET, polybutylene terephthalate (PBT), and modified PBT.

Preferably, the fiber-reinforced polyester material comprises a blend comprising a first polyester, preferably a first aromatic polyester, and a second polyester, preferably a second aromatic polyester, which preferably independently of one another comprise, preferably essentially consist of repetition units of general formula (I).

In a particularly preferred embodiment, said first polyester is polybutylene terephthalate (PBT) and said second polyester is polyethylene terephthalate (PET).

Independently of one another, the PBT and the PET may be modified. For example, cyclohexane dimethanol can be added to the polymer backbone in place of a portion of the butylene glycol and a portion of the ethylene glycol, respectively. Similarly, phthalic acid, isophthalic acid and/or dimethylterephthalic acid can be added to the polymer backbone in place of a portion of the terephthalic acid.

As the polyester material should have optimal mechanical strength, it has preferably a high degree of crystallinity, typically of at least 60%.

The relative weight ratio of the first polyester to the second polyester is not particularly limited. In a preferred embodiment, the first polyester is present in excess. In another preferred embodiment, the second polyester is present in excess. In still another preferred embodiment, the content of the first polyester is about the same as the content of the second polyester.

Preferably, the relative weight ratio of the first polyester to the second polyester is within the range of from about 1:10 to about 10:1, more preferably about 1:5 to about 5:1, still more preferably about 1:4 to about 4:1, yet more preferably about 1:3 to about 3:1, even more preferably about 1:2.5 to about 2.5:1, most preferably about 1:2 to about 2:1, and in particular about 1:1.5 to about 1.5:1.

Preferably, the fiber-reinforced polyester material comprises recycled polyester. While it is also possible that the fibers are at least partially recycled fibers, in a preferred embodiment the polyester material comprises at least partially recycled polyester.

Recycled polyester includes chemically recycled polyester as well as mechanically recycled polyester. In chemical recycling, the polymer backbone is destroyed and the building blocks of the polyester, i.e. carboxylic acid and alcohol or intermediates, are isolated in order to synthesize fresh polymers. In mechanical recycling, the original polymer properties are maintained or reconstituted.

The content of recycled polyester relative to the content of non-recycled (i.e. virgin) polyester is not particularly limited. In preferred embodiments, the content of recycled polyester is at least about 10 wt.-%, or at least about 20 wt.-%, or at least about 30 wt.-%, or at least about 40 wt.-%, or at least about 50 wt.-%, or at least about 60 wt.-%, or at least about 70 wt.-%, or at least about 80 wt.-%, or at least about 90 wt.-%, or essentially about 100 wt.-%, relative to the total weight of polyesters contained in the polyester material.

When the polyester material comprises a blend of a first polyester and a second polyester, preferably the first polyester and/or the second polyester comprises recycled polyester.

As the global consumption of PET is substantially higher than that of PBT, recycle PET is often more readily available than recycle PBT. Thus, when the polyester material according to the invention comprises a blend of PBT and PET, the PET component comprises preferably recycle PET, whereas the PBT component also comprises recycle PBT or does not comprise recycle PBT.

Besides the carrier member, the reinforcement member according to the invention comprises a heatcurable structural adhesive.

The heatcurable structural adhesive according to the invention has preferably undergone and will undergo different levels of processing at different temperatures until it finally serves its intended purpose of bonding components. The heatcurable structural adhesive is comprised in the reinforcement member together with the carrier member and thus, it usually has been molded already in the course of manufacture of the reinforcement member. The heatcurable structural adhesive has typically been applied to the carrier member at an intermediate elevated temperature at which the heatcurable structural adhesive can be molded without curing and without developing adhesive properties. After cooling to ambient temperature, the heatcurable structural adhesive on the carrier member is preferably solid and dry to the touch. The heatcurable structural adhesive is preferably solid and dry to the touch at ambient temperature, can be activated to develop adhesive properties at an elevated activation temperature, and can principally be molded again without curing at a temperature above ambient temperature and below said elevated activation temperature.

Preferably, the heatcurable structural adhesive is applied to one or more outer surfaces or portions of said surfaces of the carrier member. Preferably, the heatcurable structural adhesive can be regarded as a coating of the carrier member.

Thickness of the layer of the heatcurable structural adhesive on the carrier member is not particularly limited and depends on the intended use of the reinforcement member, e.g. the size and volume of the cavity where it is to be placed at. In preferred embodiments, the thickness is at least about 0.1 mm, or at least about 0.5 mm, or at least about 1 mm, or at least about 3 mm.

The shape of the heatcurable structural adhesive on the carrier member is not particularly limited. In a preferred embodiment, the heatcurable structural adhesive forms a uniform coating of the carrier member so that the outer shape of the reinforcement member is not substantially altered by the heatcurable structural adhesive, but is essentially based upon the shape of the carrier material. In another preferred embodiment, the heatcurable structural adhesive forms a non-uniform coating of the carrier member so that the outer shape of the reinforcement member differs from the outer shape of the carrier material Preferably, the heatcurable structural adhesive is solid and dry to the touch at room temperature and can be processed by heating at a temperature below that at which it will cure (cure temperature), particularly so that the heatcurable structural adhesive can be processed e.g. by melt coating, extrusion or injection molding and can resolidify on cooling without reacting during the forming process. When the heatcurable structural adhesive contains a blowing agent, the material preferably does not yet expand under these conditions, i.e. at temperatures below the cure temperature.

The heatcurable structural adhesive is preferably dry to the touch at ambient temperature (20° C.) and preferably can be pelletized and molded at temperatures below the activation temperature of the curing agent and any blowing agent that may be present. The heatcurable structural adhesive therefore preferably has a melting point within the range of from about 80° C. to about 120° C., more preferably from about 80° C. to about 110° C., preferably with a cure temperature within the range of from about 130° C. to about 210° C., more preferably from about 130° C. to about 150° C.

The invention is particularly aimed at heatcurable structural adhesives that upon curing provide structural adhesive materials which can be used in the automotive and aerospace industries and can add strength to the area where the adhesive is used by rigidifying the bond between substrates (components) and adding stiffness to the bond without imparting undesirable brittleness.

The heatcurable structural adhesive according to the invention is not particularly limited and includes any conventional heatcurable structural adhesive that is commercially available.

Preferably, the heatcurable structural adhesive according to the invention is epoxy based, i.e. comprises an epoxy material, preferably in combination with a curing agent. Besides epoxy material and curing agent, the heatcurable structural adhesive preferably contains one or more additional components, such as curing accelerators, impact modifiers, flexibilizers, blowing agents, blowing accelerators, thermoplastic modifiers, and the like.

In preferred embodiments, the heatcurable structural adhesive comprises an epoxy resin as well as a curing agent, and additionally
  a curing accelerator; and/or
  an impact modifier selected from epoxy functionalized impact modifiers and core/shell impact modifiers; and/or
  a flexibilizer selected from hydroxy terminated urethane prepolymers and polyvinyl butyral resins; and/or
  a blowing agent, optionally in combination with a blowing accelerator; and/or
  a thermoplastic modifier selected from phenoxy resins.

In a particularly preferred embodiment, the heatcurable structural adhesive comprises an epoxy resin and a curing agent, and additionally
  a curing accelerator; and/or
  a first impact modifier selected from epoxy functionalized impact modifiers in combination with a second impact modifier selected from core/shell impact modifiers; and/or
  a first flexibilizer selected from hydroxy terminated urethane prepolymers in combination with a second flexibilizer selected from polyvinyl butyral resins; and/or
  a blowing agent in combination with a blowing agent accelerator.

In another particularly preferred embodiment, the heatcurable structural adhesive comprises an epoxy resin and a curing agent, and additionally
  a curing accelerator; and/or
  an impact modifier selected from epoxy functionalized impact modifiers; and/or
  a first flexibilizer selected from hydroxy terminated urethane prepolymers in combination with a second flexibilizer selected from polyvinyl butyral resins; and/or
  a thermoplastic modifier selected from phenoxy resins.

In a preferred embodiment, the heatcurable structural adhesive is foamable in which case it will contain a physical and/or chemical blowing agent, optionally in combination with a blowing accelerator. In this embodiment, the structural adhesive will expand to a volume greater than its volume in the unexpanded state (e.g., at least about 5% greater, at least about 20% greater or even possibly at least about 50% greater). Where the structural adhesive is to be employed in areas where it is desired to reduce deformation on input, it is preferred that the volumetric expansion be relatively low such that the expanded volume is not more than about 400%, more preferably not more than about 300%, even more preferably not more than about 200%, relative to the original unexpanded volume.

The heatcurable structural adhesive preferably comprises an epoxy resin or a mixture of various epoxy resins.

For the purpose of specification, "epoxy resin" refers to any conventional dimeric, oligomeric or polymeric epoxy material containing at least one epoxy functional group, i.e. one or more reactive oxirane rings polymerizable by a ring opening reaction. Moreover, the term "epoxy resin" refers to one epoxy resin or any combination of epoxy resins. The epoxy resin may increase the adhesion, flow properties, or both of the heatcurable structural adhesive. The hardening of the heatcurable structural adhesive at least partially relies upon the presence of reactive oxirane rings in the epoxy resin; upon heating, said reactive oxirane rings react e.g. with a curing agent thereby achieving crosslinking (curing) and hardening of the heatcurable structural adhesive thus providing a structural adhesive material.

Preferably, the heatcurable structural adhesive comprises, relative to the total weight of the heatcurable structural adhesive, from about 2 wt.-% to about 70 wt.-%, more preferably from about 15 wt.-% to about 55 wt.-%, and most preferably from about 25 wt.-% and about 45 wt.-% epoxy resin.

The epoxy resin can be difunctional, trifunctional, multifunctional, or combinations thereof. The epoxy resin may be aliphatic, cycloaliphatic, aromatic, or any combination thereof. The epoxy resin may be supplied as a solid (e.g., as pellets, chunks, pieces or the like) or as a liquid, or both. As used herein, an epoxy resin is considered to be a solid epoxy resin if it is solid at a temperature of 23° C. and it is considered to be a liquid epoxy resin if it is a liquid at 23° C.

Preferably, the epoxy resin comprises an epoxy resin selected from aromatic epoxy resins and aliphatic epoxy resins, aromatic epoxy resins being preferred. Preferably, the epoxy resin is selected from the group consisting of bisphenol-A epoxy resins (e.g., diglycidyl ethers of bisphenol-A), bisphenol-F epoxy resins (e.g. diglycidyl ethers of bisphenol-F), novolac epoxy resins (e.g., epoxy phenol novolacs (EPN) and epoxy cresol novolacs (ECN)), aliphatic epoxy resins (e.g., glycidyl epoxy resins and cycloaliphatic epoxides) and glycidylamine epoxy resins (e.g., triglycidyl-p-aminophenol and N,N,N,N-tetraglycidyl-4,4-methylenebis benzylamine). Various mixtures of different epoxy resins may be employed according to the invention. Suitable epoxy resins are commercially available e.g. under the tradename DER® (e.g., DER 331, DER 661, DER 662), the Dow Chemical Company; under the tradename EPON (e.g., EPON 828, EPON 863), Hexion Specialty Chemicals; and under the tradename Araldite® (e.g., GY 281, GY 282, GY 285, GT 6097, and GT 7071), Huntsman Chemical.

The heatcurable structural adhesive preferably comprises a curing agent or a mixture of various curing agents.

The curing agent assists the heatcurable structural adhesive in curing by crosslinking of the epoxy resin and other ingredients of the heatcurable structural adhesive. The curing agent can be difunctional, trifunctional, or multifunctional.

Preferably, the heatcurable structural adhesive comprises, relative to the total weight of the heatcurable structural adhesive, from about 0.001 wt.-% to about 9 wt.-%, more preferably from about 0.1 wt.-% to about 6 wt.-%, and most preferably from about 2 wt.-% to about 6 wt.-% of one or more curing agents.

The curing agent is preferably aliphatic or aromatic. Preferably, the curing agent is selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), dihydrazides, sulfonamides, diamino diphenyl sulfone, anhydrides, mercaptans, imidazoles, ureas, tertiary amines, $BF_3$ complexes or mixtures thereof. Particular preferred curing agents include but are not limited to modified and unmodified polyamines or polyamides such as triethylenetetramine, diethylenetriamine, tetraethylenepentamine, cyanoguanidine, dicyandiamides and the like. Suitable curing agents are commercially available, e.g. under the tradename Dyhard®, Alzchem (e.g. Dyhard 1005) or Amicure, Air Products.

The curing agent may be activated by mixing with other ingredients of the heatcurable structural adhesive or by exposure to a condition such as radiation, moisture, pressure or the like. Preferably, the heatcurability of the heatcurable structural adhesive relies upon the heat activatability of the curing agent so that it is preferably latent and heat activated.

The heatcurable structural adhesive may additionally comprise an accelerator for the curing agents (curing accelerator). Suitable curing accelerators include but are not limited to modified or unmodified urea such as methylene bis(phenyl dimethyl urea), imidazole, blocked amines or a combination thereof. Suitable curing accelerators are commercially available, e.g. under the tradename Omicure® (e.g. Omicure U52).

Preferably, the heatcurable structural adhesive comprises, relative to the total weight of the heatcurable structural adhesive, from about 0.001 wt.-% to about 9 wt.-%, more preferably from about 0.1 wt.-% to about 6 wt.-%, and most preferably from about 2 wt.-% to about 6 wt.-% of one or more curing accelerators.

In a preferred embodiment, the heatcurable structural adhesive comprises at least one curing accelerator. In another preferred embodiment, the heatcurable structural adhesive does not comprise a curing accelerator.

Besides the epoxy resin and the curing agent, the heatcurable structural adhesive may contain other additives such as impact modifiers, flexibilizers and other elongation promoting additives, fillers, and other polymers or copolymers, blowing agents, blowing accelerators, and other additives.

Preferably, the heatcurable structural adhesive comprises an impact modifier or a mixture of various impact modifiers, sometimes also referred to as "toughening agent". Preferably, an impact modifier contributes to the desired mechanical properties of the adhesive such as T Peel strength by the distribution of energy within the adhesive system.

For the purpose of specification, the term "impact modifier" can include but are not limited to one impact modifier or several impact modifiers. Preferred impact modifiers include but are not limited to thermoplastics, thermosets or thermosettables, elastomers, combinations thereof or the like. In a preferred embodiment, the impact modifier comprises elastomer (including elastomer containing materials), a core/shell polymer (which may include but are not limited to elastomers), or a combination thereof.

Preferably, the heatcurable structural adhesive comprises, relative to the total weight of the heatcurable structural adhesive, at least about 4 wt.-%, more preferably at least about 10 wt.-%, and most preferably at least about 20 wt.-% impact modifier and preferably not more than about 70 wt.-%, more preferably not more than about 40 wt.-%, an most preferably not more than about 30 wt.-% impact modifier.

In a preferred embodiment, the heatcurable structural adhesive comprises at least two impact modifiers that comprise a substantial portion of a core/shell polymer (core/shell impact modifier).

For the purpose of specification, the term "core/shell impact modifier" refers to an impact modifier wherein a substantial portion (e.g., greater than 30 wt.-%, 50 wt.-%, 70 wt.-% or more) thereof is comprised of a first polymeric material (i.e., the first material or the core material) that is substantially entirely encapsulated by a second polymeric material (i.e., the second material or the shell material). The first and second polymeric materials, as used herein, can be comprised of one, two, three or more polymers that are combined and/or reacted together (e.g., sequentially polymerized) or may be part of separate or the same core/shell systems.

The first and second polymeric materials of the core/shell impact modifier independently of one another can include but are not limited to elastomers, polymers, thermoplastics, copolymers, other components, combinations thereof or the like. In preferred embodiments, the first polymeric material, the second polymeric material or both of the core/shell impact modifier include but are not limited to or are substantially entirely composed of (e.g., at least 70 wt.-%, 80 wt.-%, 90 w.-% or more) one or more thermoplastics. Exemplary thermoplastics include but are not limited to polystyrenics, polyacrylonitriles, polyacrylates, polyacetates, polyamides, and polyolefins.

Preferred core/shell impact modifiers are formed by emulsion polymerization followed by coagulation or spray drying. In certain applications, coagulated grades of core/shell impact modifiers have been found particularly desirable for promoting adhesion to surfaces having impurities thereon such as dirt, oil (e.g., metal stamping oil) or the like. Such impact modifiers can reduce the likelihood of adhesive failure (as opposed to cohesive failure).

Examples of useful core/shell graft polymers that may be employed as core/shell impact modifiers are those where hard containing compounds, such as styrene, acrylonitrile or methyl methacrylate, are grafted onto a core made from polymers of soft or elastomeric containing compounds such as butadiene or butyl acrylate.

Preferred core/shell impact modifiers comprise core polymers which are obtainable by polymerizing a first monomer mixture comprising butyl acrylate, but can also comprise ethyl acrylate, isobutyl acrylate, 2-ethylhexyl acrylate or other alkyl acrylates or mixtures thereof. Said first monomer mixture may also comprise other copolymerizable containing compounds, such as styrene, vinyl acetate, methyl methacrylate, butadiene, isoprene, or the like. Said first monomer mixture may also comprise cross-linkers having two or more nonconjugated double bonds of approximately equal reactivity such as ethylene glycol diacrylate, butylene glycol dimethacrylate, and the like.

Furthermore, said first monomer mixture may also comprise a graft linking monomer having two or more nonconjugated double bonds of unequal reactivity such as, for example, diallyl maleate and allyl methacrylate. The shell polymers of these core/shell impact modifiers are preferably obtainable by polymerizing a second monomer mixture comprising methyl methacrylate and optionally other alkyl methacrylates, such as ethyl methacrylates and butyl methacrylates or mixtures thereof. Preferably, said second monomer composition comprises up to 40 wt.-% or more of monomers selected from styrene, vinyl acetate, vinyl chloride, and the like, relative to the total weight of all monomers in said second monomer composition. Core/shell impact modifiers of this type are known e.g. from U.S. Pat. No. 3,985,703. Additional graft copolymers that are useful core/shell impact modifiers in accordance with the invention are described in U.S. Pat. Nos. 3,984,497; 3,944,631; 4,034,013; 4,096,202; 4,304,709; 4,306,040; 4,495,324; and 4,536,436.

Further preferred core/shell graft polymers that are useful as core/shell impact modifiers in accordance with the invention include methacrylate-butadiene-styrene copolymers (MBS), which are obtainable by polymerizing methyl methacrylate in the presence of polybutadiene or a polybutadiene copolymer rubber. The MBS graft polymers generally comprise a styrene butadiene rubber core and a shell of acrylic polymer or copolymer.

Examples of other preferred core/shell graft polymers that are useful as core/shell impact modifiers in accordance with the invention include but are not limited to, acrylonitrile-butadiene-styrene copolymers (ABS), methacrylate-acrylonitrile-butadiene-styrene copolymers (MABS), acrylate-styrene-acrylonitrile copolymers (ASA), all acrylics, styrene-acrylonitrile grafted onto elastomeric backbones of ethylene-propylene diene monomer (SA EPDM), methacrylic-acrylic rubber styrene copolymers (MAS), and the like and mixtures thereof. Another preferred core/shell impact modifier comprises a shell of polymethyl methacrylate (PMMA) or acrylonitrile polymer or copolymer and a core of butadiene or styrene butadiene polymeric material.

Useful core/shell impact modifiers are commercially available e.g. under the tradename, PARALOID® (e.g. EXL-2691A and EXL-2650A), Dow Chemical. Other preferred materials are CLEARSTRENGTH E-950 and Biostrength 150, Arkema. Other preferred core/shell impact modifiers include but are not limited to those with a relatively soft acrylate core (e.g., polybutyl acrylate or other low $T_g$ acrylate) and a hard acrylate shell (e.g., PMMA). Preferred materials are sold under the tradename DURASTRENGTH D-440, Arkema and Paraloid EXL-2300 and 2314, Dow Chemical.

In a preferred embodiment, the heatcurable structural adhesive comprises at least one core/shell impact modifier. In another preferred embodiment, the heatcurable structural adhesive does not comprise a core/shell impact modifier.

In another preferred embodiment, the impact modifier comprises an elastomer or rubber. Preferred examples include but are not limited to particulate (e.g., ground or pulverized) elastomer or rubber or adducts thereof (e.g., carboxyl terminated butadiene acrylonitrile rubber/epoxy adduct, epoxy/CTBN adduct). CTBN liquid polymers undergo addition esterification reactions with epoxy resins, allowing them to serve as elastomeric modifiers to enhance impact strength, peel strength, and crack resistance. Examples of impact modifiers of this type include but are not limited to HYPDX RK 8-4, CVC Specialty Chemicals, or Araldite LT 1522 ES, Huntsman Chemical.

Preferred epoxy/CTBN (carboxy-terminated butadiene acrylonitrile polymer) adducts that may be contained as impact modifiers in the heatcurable structural adhesive include but are not limited to epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials comprises polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include but are not limited to polyphenols such as resorcinol; catechol; hydroquinone; bis(4-hydroxyphenyl)-2,2-propane, i.e., bisphenol-A; bis(4-hydroxyphenyl)-1,1-isobutane; 4,4-dihydroxybenzophenone; bis(4-hydroxy-phenol)-1,1-ethane; bis(2-hydroxyphenyl)-methane and 1,5-hydroxynaphthalene.

Liquid rubber modified epoxy resins (adducts) may also be preferred. Particularly preferred are solid epoxy adducts of a carboxylated, solid, high molecular weight nitrile rubber. It may also be desirable to include another nitrile rubber such as a hydrogenated butadiene nitrile rubber as part of the whole of the impact modifier. These can interact synergistically with the core/shell impact modifier to increase elongation but should be used in low amounts to retain the desired $T_g$, e.g. of 80° C. or higher.

Preferably, the heatcurable structural adhesive comprises an impact modifier or a mixture of various flexibilizers and elongation promoting additives, respectively.

The presence of certain polymers without epoxy reactivity in the heatcurable structural adhesive can lead to the increased elongation at break and/or flexibility of the cured structural adhesive material. For the purpose of specification, polymers of this type are referred to as "flexibilizers". This term also includes elongation promoting additives. For the purpose of specification, the term "flexibilizer" refers to a single flexibilizer or to a combination of multiple different flexibilizers.

Without being bound by theory, it is believed that the polymer mixture undergoes phase separation during the curing of the epoxy reactive components providing more flexible zones within the cured structural adhesive material. Alternatively, the flexibilizers may act as plasticizing agent that is compatible with epoxy resin but forms domains between cross-linked epoxy molecules that promote the ability of the material to deform without breaking. Flexibilizers are useful in increasing overall polymer matrix plasticity which in turn makes the addition of other types of toughening agent more effective by, for example, phase separation of rubber modified epoxies and the use of core/shell impact modifiers.

Preferably, the heatcurable structural adhesive comprises, relative to the total weight of the heatcurable structural adhesive, at least about 2 wt.-%, more preferably at least about 3 wt.-%, and most preferably at least about 5 wt.-% flexibilizer and preferably not more than about 50 wt.-%, more preferably not more than about 35 wt.-%, and most preferably not more than about 20 wt.-% flexibilizer, although higher and lower percentages may also be possible unless otherwise stated. It is also contemplated in particular that the amount of flexibilizer may be higher in embodiments where the flexibilizer is modified with an epoxy component.

Preferred flexibilizers that may be contained in the heatcurable structural adhesive are hydroxy terminated urethane polymers or prepolymers. Isocyanate termination should be avoided, as this can produce simple component materials that have limited shelf stability due to the reaction of the isocyanate functionality with moisture, either atmospheric, or within the material. Hydroxy terminated urethane prepolymers are commercially available, e.g. under the tradename Estane®, Lubrizol and Pearlbond®, Merquinson.

Alternative or additional flexibilizers that may be contained in the heatcurable structural adhesive are polyvinyl esters, preferably polyvinyl butyral resins such as the Butvar resins available from Solutia, particularly Butvar 90 and the Mowital resins available from Kuraray are useful.

Other preferred flexibilizers are modified and include but are not limited to polymers that are amine modified, epoxy modified, or both. These polymers can include but are not limited to thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other epoxy type.

Preferred modified flexibilizers are epoxidized polysulfides, e.g. those commercially available under the tradename Thioplast EPS-350 and EPS-80, Akzo Nobel; or Flexibilizer DY 965 CH, Huntsman Chemical.

Further preferred modified flexibilizers are epoxy-dimer acid elastomers, e.g. those commercially available under the tradename HYPDX DA 323, CVC Specialty Chemicals.

Still further preferred modified flexibilizers are polyurethane modified epoxies, e.g. those commercially available under the tradenames GME-3210 and G E-3220, GNS Technologies. Without being bound by theory, it is believed that when the heatcurable structural adhesive comprises a polyurethane modified epoxy flexibilizer, the heatcurable structural adhesive may substantially maintain impact strength (e.g., impact resistance) at low temperatures, while minimizing the reduction of $T_g$ (e.g., as compared to other flexibilizers).

Yet further preferred modified flexibilizers are amine or epoxy terminated polyethers, e.g. those commercially available under the tradename JEFFAMINE® (e.g., D-2000), Huntsman Chemical and DER® (e.g. 732), Dow Chemical Company.

Further preferred flexibilizers are based on cashew nutshell liquid, e.g. the epoxidized liquids commercially available under the tradename Cardolite® (e.g. NC-514 and Lite 2513 HP).

Low melting thermoplastic polyamides are also particularly useful, e.g. those that are commercially available under the tradename Elvamide®, DuPont. Preferred are the polyamide resins melting at a temperature in the range of from about 110° C. to about 175° C., more preferably from about 115° C. to about 160° C.

All of the individual flexibilizers discussed herein may be contained separately or in combination with each other in the heatcurable structural adhesive, unless otherwise stated.

In a preferred embodiment, the heatcurable structural adhesive comprises at least one flexibilizer. In another preferred embodiment, the heatcurable structural adhesive does not comprise a flexibilizer.

Preferably, the heatcurable structural adhesive comprises one or more fillers, including but not limited to particulate materials (e.g., powder), beads, microspheres, or the like.

Fillers can impart properties such as strength, dimensional stability, and impact resistance to the cured structural adhesive material. However, fillers can reduce elongation properties. Fillers can also reduce formulation costs and provide compositions that have less tack prior to cure.

Preferably, the heatcurable structural adhesive comprises, relative to the total weight of the heatcurable structural adhesive, from about 2 wt.-% to about 30 wt.-% or greater, more preferably from about 8 wt.-% to about 25 wt.-% filler. However, overall filler contents below 20 wt.-% are preferred in order to retain the desired elongation of the cured structural adhesive material.

Preferably, when the filler is clay or a similar clay-like material, the heatcurable structural adhesive comprises, relative to the total weight of the heatcurable structural adhesive, from about 0 wt.-% to about 2 wt.-%, more preferably not more than about 1 wt.-% clays or similar fillers.

Preferably, when the filler is a powdered material, e.g. a mineral filler, e.g. having an average particle diameter of from about 0.01 micron to about 50 micron, preferably from about 1 micron to about 25 micron, the heatcurable structural adhesive preferably comprises, relative to the total weight of the heatcurable structural adhesive, from about 5 wt.-% to about 40 wt.-%, more preferably from about 10 wt.-% to about 25 wt.-% powdered material.

Preferred fillers include but are not limited to silica, diatomaceous earth, glass, clay (e.g., including nanoclay), talc, pigments, colorants, glass beads or bubbles, carbon or ceramic fibres, chopped or continuous glass, ceramic, aramid (e.g., Kevlar), or carbon fibres, and nylon or polyamide fibres. Examples of suitable fillers include but are not limited to wollastonite, talc, vermiculite, pyrophyllite, sauconite, saponite, nontronite, montmorillonite or mixtures thereof. Suitable clays may be calcined or uncalcined and include but are not limited to clays from the kaolinite, illite, chloritem, smecitite or sepiolite groups. The clays may also comprise minor amounts of other ingredients such as carbonates, feldspars, micas and quartz. Fibers may improve reinforcement of the cured structural adhesive material.

In a preferred embodiment, the heatcurable structural adhesive comprises one or more mineral or stone type fillers such as calcium carbonate, sodium carbonate or the like. In another preferred embodiment, the heatcurable structural adhesive comprises silicate mineral such as mica as fillers.

In a preferred embodiment, the heatcurable structural adhesive comprises at least one filler. In another preferred embodiment, the heatcurable structural adhesive does not comprise a filler.

If the heatcurable structural adhesive is foamable it will contain one or more blowing agents (foaming agents) that typically produce inert gasses that transform the adhesive into an open and/or closed cellular structure. The expansion can help to improve adhesion, sealing capability, acoustic damping, reduce density, or a combination of factors.

Contents of blowing agents in the heatcurable structural adhesive can vary widely depending upon the type of cellular structure desired, the desired amount of expansion of the heatcurable structural adhesive, the melt viscosity of the ingredients, and the desired rate of expansion.

Preferably, the heatcurable structural adhesive comprises from about 0.001 wt.-% to 2 wt.-% blowing agents, relative to the total weight of the heatcurable structural adhesive.

The blowing agent can be a chemical blowing agent or a physical blowing agent.

Chemical blowing agents include but are not limited to compounds comprising one or more nitrogen containing groups such as amides, amines, and the like. Examples of suitable chemical blowing agents include but are not limited to dinitrosopentamethylenetetramine, azodicarbonamide, dinitroso-pentamethylenetetramine, 4,4'oxy-bis-(benzene-sulphonylhydrazide), trihydrazinotriazine and N,N'-dimethyl-N,N'-dinitroso-terephthalamide.

Physical blowing agents include but are not limited to solvent filled polymeric shells that soften and expand upon exposure to heat. Physical blowing agents of this type are commercially available e.g. under the tradename Expancel®, Akzo Nobel.

In a preferred embodiment, the heatcurable structural adhesive comprises at least one blowing agent. In another preferred embodiment, the heatcurable structural adhesive does not comprise a blowing agent.

Blowing accelerators may be added to the heatcurable structural adhesive in order to improve the performance of the blowing agent. Blowing accelerator increase the rate at which the blowing agents form inert gasses.

Preferably, the heatcurable structural adhesive comprises from about 0.001 wt.-% to 2 wt.-% blowing accelerator, relative to the total weight of the heatcurable structural adhesive.

One preferred blowing accelerator is a metal salt, such as an oxide, for example zinc oxide. Other preferred accelerators include but are not limited to organic bases such as urea and organic acids such as adipic acid or benzoic acid. Zinc benzene sulfonate is also a suitable blowing accelerator.

In a preferred embodiment, the heatcurable structural adhesive comprises at least one blowing accelerator. In another preferred embodiment, the heatcurable structural adhesive does not comprise a blowing accelerator.

In a preferred embodiment, the heatcurable structural adhesive comprises a thermoplastic modifier or a mixture of various thermoplastic modifiers. This embodiment is particularly preferred when the heatcurable structural adhesive contains neither blowing agent not blowing accelerator.

The thermoplastic modifier is typically a polyether comprising pendant hydroxyl moieties. Preferred thermoplastic polyethers are phenoxy resins.

For the purpose of specification, "phenoxy resin" refers to any polyhydroxyether with phenylether linkages along the polymer backbone and preferably also with pendant hydroxyl groups. Preferred phenoxy resins are derived from epoxides, preferably from bisphenol-A or bisphenol-F. In comparison to the corresponding epoxy resins, however, these phenoxy resins have a higher weight average molecular weight (typically within the range of from about 25,000 g/mol to about 100,000 g/mol) and contain virtually no epoxide groups (since terminal epoxy groups, if any, are insignificant compared to the total size of the molecule).

Preferably, the heatcurable structural adhesive comprises, relative to the total weight of the heatcurable structural adhesive, from about 3 wt.-% to about 40 wt.-%, more preferably from about 7 wt.-% to about 30 wt.-%, and most preferably from about 10 wt.-% to about 15 wt.-% of one or more thermoplastic modifiers.

A preferred thermoplastic modifier is a phenoxy resin that is the reaction product of a phenol based difunctional epoxy resin and a difunctional phenol (for example the reaction product of epoxydized bisphenol A with bisphenol A). A similar material may also be synthesized directly from a bisphenol (for example bisphenol A) and epichlorohydrin. The terminal epoxy group may be ring opened to generate a terminal alpha glycol group.

In a preferred embodiment, the phenoxy resin is provided in form of a phenoxy dissolution product comprising a mixture of a first phenoxy resin comprising repetition units derived from bisphenol-A and a second phenoxy resin comprising repetition units derived from bisphenol-F. Preferably, the relative weight ratio of said first phenoxy resin and said second phenoxy resin is within the range of from about 10:1 to about 1:2, more preferably about 5:1 to about 1:1, and still more preferably 4:1 to about 2:1.

Other thermoplastic polyethers include but are not limited to aromatic ether/amine repeating units in their backbones such as polyetheramines, poly(amino ethers), copolymers of monoethanolamine and diglycidyl ether, combinations thereof or the like. Examples of suitable thermoplastic polyethers are disclosed in U.S. Pat. Nos. 5,275,853, 5,464, 924 and 5,962,093.

Suitable phenoxy resins are commercially available under the tradename PAPHEN® (e.g. PKHH and PKHJ), Inchem Corp.; Kukdo (e.g. YP-50); and Epalloy (e.g. 8220), CVC Thermoset Specialities.

In a preferred embodiment, the heatcurable structural adhesive comprises at least one thermoplastic modifier, e.g. a phenoxy resin. In another preferred embodiment, the heatcurable structural adhesive does not comprise a thermoplastic modifier, e.g. no phenoxy resin.

Besides epoxy resin, curing agent, impact modifier, flexibilizer, blowing agent, filler, blowing accelerator, and/or thermoplastic modifier, the heatcurable structural adhesive may comprise one or more additional polymers, which are typically, but not necessarily copolymers, and which include but are not limited to a variety of different polymers, such as thermoplastics, elastomers, thermosets, thermosettables combinations thereof or the like.

When contained in the heatcurable structural adhesive, the primary purpose of these additional polymers is to provide more thermoplastic-like characteristics of the heatcurable structural adhesive in the uncured state, including e.g. more uncured flexibility, less tack in the uncured state, reduced cold flow prior to cure, improved processing when typical polymer processing equipment is used. During the curing process, these additional polymers can also act as viscosity modifiers to modify sag and flow behavior.

For example, and without limitation, the heatcurable structural adhesive may comprise one or more additional polymers independently selected from the group consisting of polyolefins, polyethylene, polypropylene, polyallyls, polyisobutylene, polyisoprene, polystyrenes, polyacrylates (e.g., ethylene methyl acrylate copolymers), polymethacrylates, polymethylmethacrylate, polyacrylonitrile, polyacrylamide, polyacrylic acid, halogenated polymers, polyvinyl chloride, polyvinylidene chloride, polytetrafluoroethylene, polyesters, polyterphthalates, polyacetates, polyvinyl acetate (e.g., EVA), polycarbonates, polyketones polyethers, polyethylene oxide, polyepoxies, polyurethanes, polyamides, polyimides, polyethyleneimine, polysilanes, polysilicones, polysiloxane, polysulfones, polyphenylensulfides, polyphosphazines, polyphenolics, rubbers, polyphenylene oxides, or mixtures or copolymers thereof.

In a preferred embodiment, the heatcurable structural adhesive comprises one or more ethylene polymers or copolymers, such as ethylene acrylate copolymers, ethylene vinylacetate copolymers, or the like. Ethylene methacrylate copolymers and ethylene vinyl acetate copolymers are particularly preferred ethylene copolymers.

Preferably, the heatcurable structural adhesive comprises, relative to the total weight of the heatcurable structural adhesive, from about 0.1 wt.-% to about 50 wt.-%, more preferably from about 1 wt.-% to about 20 wt.-%, and most preferably from about 5 wt.-% to about 15 wt.-% of one or more additional polymers.

In a preferred embodiment, the heatcurable structural adhesive comprises at least one additional polymer. In another preferred embodiment, the heatcurable structural adhesive does not comprise an additional polymer.

The heatcurable structural adhesive may comprise one or more polymeric or non-polymeric additives, agents or performance modifiers.

Such other additives, agents or performance modifiers include but are not limited to a UV resistant agents, flame retardants, heat stabilizers, colorants, processing aids, lubricants, slip agents, adhesion promoters (tackifiers), and the like.

Preferred adhesion promoters include but are not limited to amine or epoxy functional molecules such as amine or epoxy functional silanes. One exemplary adhesion promoter is a glycidoxypropyl trimethoxy silane, e.g. commercially available under the tradename Z-6040, Dow Corning. Other tackifiers include but are not limited to aliphatic, aromatic or aliphatic/aromatic petroleum resins, e.g. natural rosin ester tackifiers.

The heatcurable structural adhesive may comprise slip agents in order to aid processing. The viscosity required for processability depend upon the processing technique and the processing temperatures to be employed. Examples of slip agents include but are not limited to oleamide and behenamide. However, slip agents can reduce the $T_g$ of the cured structural adhesive material so their content, if any, should be minimized Preferably, the content of slip agent is not more than 1 wt.-%, relative to the total weight of the heatcurable structural adhesive.

In a preferred embodiment, the heatcurable structural adhesive comprises at least one such other additive. In another preferred embodiment, the heatcurable structural adhesive does not comprise such other additive.

Another aspect of the invention relates to a method to produce a reinforcement member according to the invention as described above, said method comprising the following steps:
a. production of the carrier member,
b. cooling of the carrier member, and
c. production of the heatcurable structural adhesive,
d. combining the carrier member and the structural adhesive
wherein the material of the carrier member preferably comprises recycled polyesters.

Preferably, the method to produce a reinforcement member according to the invention as described above comprising the following steps
a. hot processing the carrier member by molding, preferably by compression molding, extrusion, pultrusion or injection molding,
b. cooling of the carrier member, preferably allowing the carrier member to cool or actively cooling it, and
c. processing of the heatcurable structural adhesive by molding, preferably by extrusion molding or preferably by overmolding, i.e. injection molding, it over the carrier member (substrate),
wherein the material of the carrier member preferably comprises recycled polyesters.

According to a preferred embodiment, the cooling in step b. takes place with ambient air, regardless of its relative humidity.

In step c., the heatcurable structural adhesive may be applied to the carrier member by conventional methods such as melt coating, dipping, extrusion coating, and the like.

It may be important that during processing the temperature remains below activation temperatures that would cause the heatcurable structural adhesive to cure (crosslink, harden) and to foam, if a blowing agent is present.

The heatcurable structural adhesive is preferably applied to the carrier member as a melt at a temperature below that at which curing and foaming occur. The heatcurable structural adhesive may be pelletized for use in extrusion and injection molding which are preferred methods of application. Following application, the resultant reinforcement member can be cooled to provide a dry to the touch heatcurable adhesive layer on the carrier member. The carrier member may then be assembled together with the other components to be bonded, optionally after transportation, and the heatcurable structural adhesive then activated by heat to develop adhesive properties and form the bond.

The invention also relates to reinforcement members that are obtainable by the method according to the invention Activation of the heatcurable structural adhesive may include at least some degree of foaming or bubbling in situations where the heatcurable structural adhesive comprises a blowing agent. Such foaming or bubbling can assist the heatcurable structural adhesive in wetting a substrate and forming an intimate bond with the substrate.

Depending upon the intended application, the heatcurable structural adhesive may be applied and activated in different ways and at different times. Thus, exemplary uses of the reinforcement member according to the invention are discussed below to illustrate preferred methodologies of application and activation. In particular, the reinforcement member may be used for, amongst others, reinforcement, sealing and adhering, acoustic baffling or the like. Examples of potential uses are disclosed in U.S. Pat. Nos. 7,125,461, 7,892,396, WO 03/022953, EP 2 231 348 and GB 1201943.6.

As another example, the reinforcement member may be pressed between the surfaces to be bonded together and subsequently the heatcurable structural adhesive may be activated. It should also be recognized that the surfaces to be bonded may be part of single component or member or two or more components or members that are attached to each other by the heatcurable structural adhesive and optional additional attachments.

In one embodiment, the surfaces to be bonded are part of the components of an automotive vehicle. In such an embodiment, the heatcurable structural adhesive is typically activated at an elevated temperature employed in an automotive coating drying operation (e.g., at temperatures common to e-coat or automotive painting operations, temperatures typically from 120° C. to 250° C.). Examples of structural adhesive applications are disclosed e.g. in U.S. Pat. No. 6,887,914 and US 2003/0186049.

A further requirement of structural adhesives in certain uses particularly in the automobile industry is that they will adhere to a metal surface that carries a stamping oil. Additionally it is preferred that the heatcurable structural adhesive will flow to cover the entire metal surfaces and that the adhesion to the metal surfaces is stronger than the internal adhesion within the structural adhesive (e.g., a cohesive failure on the metal). This is assessed by separating the bonded metal surfaces and determining the percentage of the surface area that carries the adhesive.

Typically, the reinforcement member is applied as a preformed part. The reinforcement member may be shaped to form an article of substantially predetermined dimension, for example by molding or by extrusion and/or cutting.

Another aspect of the invention therefore relates to the use of a reinforcement member according to the invention as described above for bonding components of automobiles or aircrafts.

Another aspect of the invention relates to a method of bonding components of automobiles comprising the step of heating a reinforcement member as described above. Preferably, heating is achieved during automotive e-coat or painting operations.

Another aspect of the invention relates to bonded components of automobiles or aircrafts comprising the reinforcement member as described above.

EXAMPLES

The following examples and explanations do not limit the scope of the present invention. The explanations apply to all embodiments of the invention likewise.

Two different reinforcement members were designed to form a part for the D-ring of a vehicle. The D-ring comprises the D-rings and the cross beam of the vehicle. The reinforcement member is inserted into the structure of the vehicle in order to improve the torsion stiffness of the vehicle. The reinforcement member comprises a carrier member.

According to comparative configuration 1, said carrier member is based on fiber-reinforced polyamide (PA6GF30). According to inventive configuration 2, said carrier member is based on fiber-reinforced polyester (PBT/PETGF55).

The results are shown in the table here below:

|  | COMPARATIVE CONFIGURATION 1 | | INVENTIVE CONFIGURATION 2 | | UNITS |
|---|---|---|---|---|---|
| CARRIER MATERIAL NAME | PA6GF30 DSM akulon K224 HG6 | | PBT/PETGF55 Lanxess T3150XF | | |
| CARRIER MATERIAL DENSITY | 1.36 | | 1.77 | | g/cm3 |
| FIRST TORSION MODE | 43.1 | | 43.1 | | Hz |
| PART LOCATION | D-RING LOWER NODE | D-RING UPPER NODE | D-RING LOWER NODE | D-RING UPPER NODE | |
| WEIGHT | | | | | |
| CARRIER WEIGHT per PART | 48 | 186 | 61 | 129 | g |
| SEAL WEIGHT per PART | 65 | 115 | 65 | 58 | g |
| TOTAL WEIGHT per PART | 113 | 301 | 126 | 187 | g |
| NUMBER OF PARTS per VEHICLE | 2 | 2 | 2 | 2 | |
| TOTAL WEIGTH per VEHICLE | 828 | | 625 | | g |
| PROJECTED SURFACE | | | | | |
| CARRIER | 7738 | 14002 | 7738 | 8607 | mm$^2$ |
| SEAL | 3522 | 14002 | 3522 | 8607 | mm$^2$ |

The invention claimed is:

1. A reinforcement member comprising:
   a foamable heat curable structural adhesive on an outer surface of a carrier member, the foamable heat curable structural adhesive foaming to not more than about 400% of its original unexpanded volume, wherein the carrier member has a cross-section that does not comprise a constant thickness over its entire extension;
   wherein at least 90 wt.-% of the carrier member is composed of a fiber-reinforced polyester material having a degree of crystallinity of at least 60% and the content of fibers is within the range of about 20-70 wt.-% relative to the total weight of the fiber-reinforced polyester material; and
   wherein the foamable heat curable structural adhesive forms a non-uniform coating along the carrier member having a thickness of from 0.1 mm to 3 mm so that an outer shape of the reinforcement member differs from an outer shape of the carrier member, whereby the foamable heat curable structural adhesive forms a seamless connection to the carrier member.

2. The reinforcement member of claim 1, wherein the foamable heat curable structural adhesive is overmolded to the carrier member after formation of the carrier member.

3. The reinforcement member of claim 2, wherein the reinforcement member has a hollow structure.

4. The reinforcement member of claim 3, wherein the fibers are associated into bundles and the fibers have an average length in the range of about 100±50 μm.

5. The reinforcement member of claim 4, wherein the foamable heat curable structural adhesive foams to not more than about 300% of its original unexpanded volume.

6. The reinforcement member of claim 5, wherein the foamable heat curable structural adhesive foams to not more than about 200% of its original unexpanded volume.

7. The reinforcement member of claim 6, wherein the content of the fibers in the fiber-reinforced polyester material is within the range of about 40-50 wt.-% relative to the total weight of the fiber-reinforced polyester material.

8. The reinforcement member of claim 7, wherein the carrier member has an E-modulus of at least about 15 Gpa that is maintained independent of relative humidity of the ambient air.

9. The reinforcement member of claim 1, wherein the fiber-reinforced polyester material includes a first polyester and a second polyester.

10. The reinforcement member of claim 9, wherein the fibers are elongated carbon fibers.

11. The reinforcement member of claim 10, wherein the first polyester is polybutylene terephthalate (PBT).

12. The reinforcement member of claim 11, wherein the second polyester is polyethylene terephthalate (PET).

13. The reinforcement member of claim 1, wherein the foamable heat curable structural adhesive is a coating of the fiber-reinforced polyester material.

14. The reinforcement member of claim 13, wherein the foamable heat curable structure adhesive covers at least about 50% of the outer surface of the carrier member.

15. The reinforcement member of claim 9, wherein the relative weight ratio of the first polyester to the second polyester is within the range of from about 1:10 to about 10:1.

16. The reinforcement member of claim 15, wherein the first polyester, the second polyester, or both comprise recycled polyester.

17. The reinforcement member of claim 10, wherein the fibers are substantially uniaxial particles.

18. The reinforcement member of claim 9, wherein the fibers are glass fibers.

19. The reinforcement member of claim 8, wherein the E-modulus is not moisture sensitive.

20. The reinforcement member of claim 1, wherein at least 99 wt.-% of the carrier member is composed of the fiber-reinforced polyester material.

* * * * *